(12) United States Patent
Lim et al.

(10) Patent No.: US 7,031,561 B2
(45) Date of Patent: Apr. 18, 2006

(54) MONOLITHIC INTEGRATION OF MICRO-OPTICS CIRCUITS AND RF CIRCUITS

(75) Inventors: Desmond R. Lim, Cambridge, MA (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 58 days.

(21) Appl. No.: 10/177,428

(22) Filed: Jun. 21, 2002

(65) Prior Publication Data

US 2003/0031399 A1 Feb. 13, 2003

Related U.S. Application Data

(60) Provisional application No. 60/300,296, filed on Jun. 22, 2001.

(51) Int. Cl.
*G02B 6/12* (2006.01)
(52) U.S. Cl. ...................................................... 385/14
(58) Field of Classification Search ................ 385/2–3, 385/14
See application file for complete search history.

(56) References Cited

U.S. PATENT DOCUMENTS

| | | | | |
|---|---|---|---|---|
| 4,157,544 A | * | 6/1979 | Nichols ........................ 342/34 |
| 4,775,996 A | * | 10/1988 | Emerson et al. ........... 379/56.3 |
| 4,885,589 A | * | 12/1989 | Edward et al. .............. 342/175 |
| 5,138,649 A | * | 8/1992 | Krisbergh et al. .......... 455/420 |
| 5,347,601 A | * | 9/1994 | Ade et al. ..................... 385/3 |
| 5,369,410 A | * | 11/1994 | Reich .......................... 342/175 |
| 5,418,785 A | | 5/1995 | Olshansky et al. |
| 5,479,539 A | | 12/1995 | Goldsmith et al. |
| 5,585,953 A | * | 12/1996 | Zavrel ......................... 398/115 |
| 5,590,107 A | * | 12/1996 | Chatani .................... 369/53.24 |
| 5,675,345 A | * | 10/1997 | Pozgay et al. ....... 343/700 MS |
| 5,696,855 A | * | 12/1997 | Skeie ............................. 385/2 |
| 5,705,022 A | * | 1/1998 | Lewis et al. ............. 156/379.8 |
| 5,861,019 A | * | 1/1999 | Sun et al. ..................... 607/60 |
| 5,946,120 A | * | 8/1999 | Chen .......................... 398/155 |
| 6,204,951 B1 | * | 3/2001 | Coward et al. ............. 359/245 |
| 6,495,382 B1 | * | 12/2002 | Yap .............................. 438/24 |
| 6,522,793 B1 | * | 2/2003 | Szilagyi et al. ................ 385/2 |
| 6,539,146 B1 | * | 3/2003 | Ramsdell ..................... 385/24 |
| 6,555,903 B1 | * | 4/2003 | Lin et al. .................... 257/698 |
| 6,594,414 B1 | * | 7/2003 | Tungare et al. .............. 385/18 |
| 6,640,027 B1 | * | 10/2003 | Kim et al. .................... 385/28 |

(Continued)

FOREIGN PATENT DOCUMENTS

| | | |
|---|---|---|
| EP | 0 507 246 | 3/1992 |
| JP | 57-103445 | 6/1982 |

OTHER PUBLICATIONS

"Integrated Optoelectronics for Optical Transmission Systems," Maeda et al. *IEEE Communications Magazine*. May, 1988. vol. 26, No. 5.
"Optical Submarine Telecommunication System S560," J.P. Trezeguet. *Electrical Communication*. 1989. vol. 63, No. 3.

*Primary Examiner*—Ellen E. Kim
(74) *Attorney, Agent, or Firm*—Gauthier & Connors

(57) ABSTRACT

A chip for integrating functions performed by micro-optics and RF circuits including at least one optical function module that receives an optical signal and performs at least one of a plurality of optical functions. A RF function module that receives a RF signal and perform at least one of a plurality of RF functions. The at least one optical function module and the RF function module provides a monolithic integration of optics and RF circuits on the chip.

32 Claims, 1 Drawing Sheet

U.S. PATENT DOCUMENTS 6,701,031 B1 * 3/2004 Nakazawa .................... 385/7
6,785,434 B1 * 8/2004 Castoldi et al. ............... 385/14
6,818,466 B1 * 11/2004 Kornrumpf et al. .......... 438/31
6,835,004 B1 * 12/2004 Iceman et al. ................ 385/92

* cited by examiner

MONOLITHIC INTEGRATION OF MICRO-OPTICS CIRCUITS AND RF CIRCUITS

PRIORITY INFORMATION

This application claims priority from provisional application Ser. No. 60/300,296 filed Jun. 22, 2001.

This invention was made with government support under Grant Number DMR-9808941 awarded by NSF. The government has certain rights in the invention.

BACKGROUND OF THE INVENTION

The invention relates to the field of communications, and in particular to the monolithic integration of planar lightwave circuits or integrated optics RF circuits.

There are currently several modes of communication that are in use. Wireless and optical communications are two of the newer forms of communication and have been pursued in separate fields. There have been several attempts to combine these two forms of communications at the chip level. One of these attempts is the use of fiber to the home (FTTH) optical communications, which provides enormous bandwidth, but has a large overhead. However, it is a fixed line and does not meet the necessary requirements for wireless applications. Another is the radio frequency (RF) approach, which can provide the convenience of wireless but it is bandwidth limited.

There is a need in the art to combine these two modes of communications so that RF monolithic microwave circuits (MMICs) and discrete optics components can be integrated to form a bridge between RF and fiber optic communication technologies.

SUMMARY OF THE INVENTION

According to one aspect of the invention, there is provided a chip for integrating functions performed by micro-optics and RF circuits. The chip includes one or more optical function modules for assembling a plurality of optical functions. The one or more optical function modules receive an optical signal, and perform at least one of the plurality of optical functions. A RF function module assembles a plurality of RF functions. The RF function module receives a RF signal, and performs at least one of the plurality of RF functions. The one or more optical function modules and the RF function module provide a monolithic integration of optics and RF circuits on the chip.

According to another aspect of the invention, there is provided a hybrid circuit including micro-optics and RF circuits. The hybrid circuit includes at least one optical function module that receives or transmits an optical signal and performs at least one of a plurality of optical functions. A RF function module that receives a RF signal and perform at least one of a plurality of RF functions. The at least one optical function module and the RF function module are integrated on a single microchip.

DETAILED DESCRIPTION OF THE INVENTION

Figure 1:
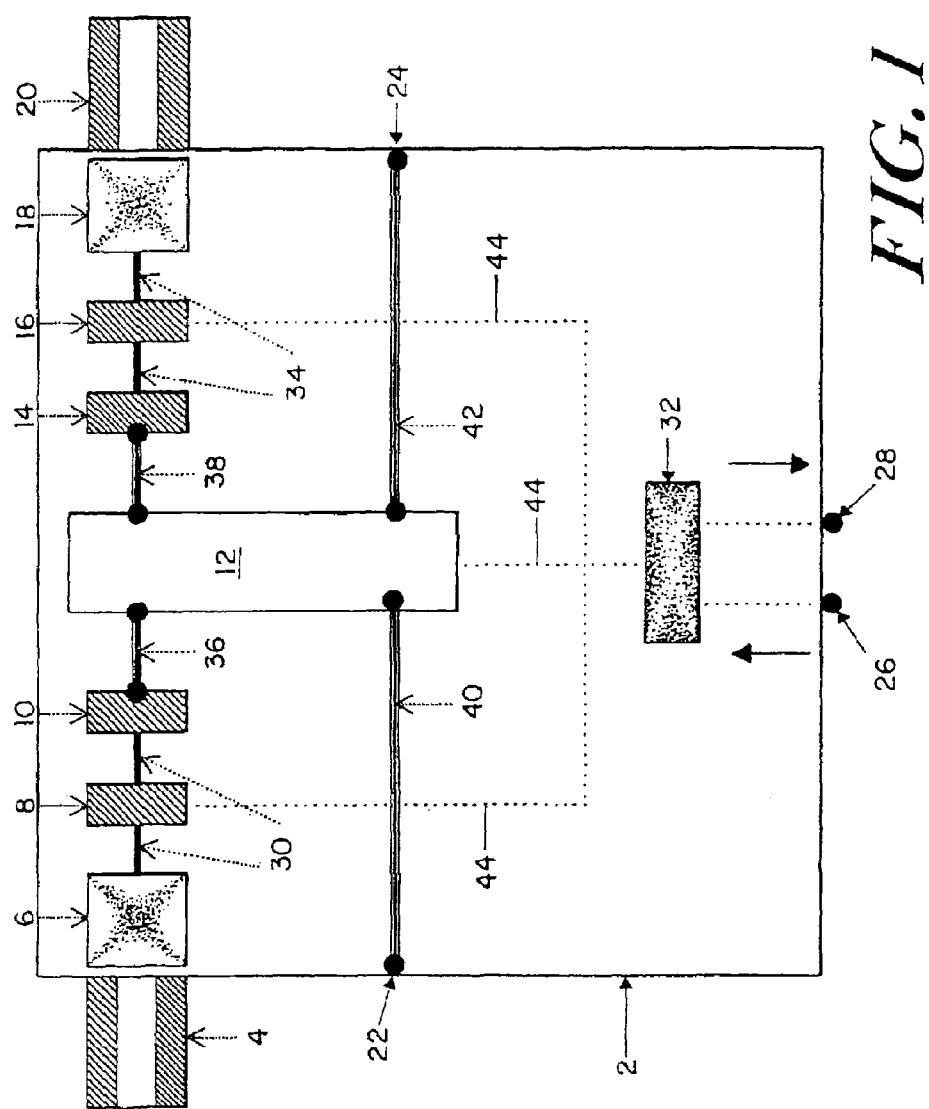
FIG. 1 is a schematic block diagram of a planar chip for implementing the invention.

FIG. 1 is a schematic block diagram of a planar chip 2 for implementing the invention. The planar chip includes a first external optical fiber 4. The first external optical fiber 4 receives an optical signal, and provides the optical signal to the planar chip 2 as input. Given the structural arrangement of optical fibers, the first external optical waveguide 4 has a mode size of approximately 8–10 µm. The mode size can vary depending on the specific carrier properties of the optical signal used in the optical fiber. The first external optical fiber 4 connects the planar chip 2 to optical signals received externally. In other embodiments, there can be more than one input optical fiber to the planar chip 2. Also, the one or more optical fibers can act as output fibers or simultaneously act as both input and output fibers in other embodiments.

The optical signals that are received by the first external optical fiber 4 are provided to a first waveguide mode converter module 6, within the planar chip 2. The first waveguide mode converter module 6 is designed monolithically on the chip 2, and converts the mode size of the optical signal to less than 3 µm. Also, the first waveguide mode converter module 6 is connected to one or more high index waveguides 30. The high index waveguides 30 provide a channel for propagating the optical signals to the various modules 6, 8, and 10 within the interior of the planar chip 2 without incorporating any substantial lost to the optical signal.

The more waveguide structures that are used in the high index difference waveguides 30, the higher the density of optical functions, because the optical functions and their associated optical routing scale inversely in size with respect to index contrast. However, care must be taken to ensure that loss is kept at a minimum. The high index waveguides 30 can include waveguide structures that are made from different high index materials, and the indexes can vary for each waveguide structure. Also, the high index waveguides 30 interconnect the first waveguide mode converter module 6 to a first optical function module 8.

The first optical function module 8 receives an optical signal from a first set of the high index waveguides 30 as input, and also receives a control electronic signal from a control module 32 as input. The first optical function module 8 is an integration of more than one optical function connected with one or more optical waveguides. This includes, but is not limited to, optical components, such as filters, splitters, dispersion compensation components, resonators, fiber couplers, switches, polarization rotators, frequency mux/demux, or the like. The electronic signal input is used to actuate the optical functions to be performed by the first optical function module 8. In other embodiments, the first function module 30 can perform various optical functions simultaneously without incurring substantial loss to the performance of the planar chip 2. After performing its optical functions, the first function module 30 provides its output to a second set of the high index waveguides 30.

The second set of the high index waveguides 30 propagates this output to a first optical-RF transducer 10. The optical-RF transducer 10 receives the output optical signal from the first optical function module 8, and proceeds to convert the optical signal into a RF signal. The RF signal has substantially the same properties as its optical counterpart, except that the frequency of the optical signal is in the RF range, and will have the same characteristics of microwave signals. Also, the RF signal is decoupled from its optical counterpart, but includes the optical function properties performed on its optical signal counterpart by the first optical function module 8.

The optical-RF transducer 10 outputs the RF signal to a first RF waveguide 36. The RF waveguide 36 propagates the RF signal to a RF function module 12, and is designed specifically to incorporate minimal loss to the RF signal. The dimensions of the RF waveguide 12 can vary depending on the distance between the optical-RF transducer 10 and the RF function module 12, and the area of the planar chip 2.

The RF function module 12 receives as input the optical signal propagated by the RF waveguide 36, and an electronic control signal from the control module 32 to actuate the RF function module 12. Also, the RF function module 12 is an integration of more than one RF function connected with one or more RF waveguides. This includes, but is not limited to, RF components, such as filters, splitters, dispersion components, resonators, fiber couplers, switches, RF amplifiers, transistors, antennae, and frequency mux/demux. Examples of RF functions that are performed by the RF function module 12 include but are not limited to detectors, lasers, modulators, WDM mux/demux, attenuators, and gain elements.

Alternatively, a RF signal can be coupled onto the planar chip 2 using RF waveguides 40 and 42. This allows the planar chip 2 to receive both RF and optical signals. The dimensions of the RF waveguides 40 and 42 are dependent on the distance between the RF function module 12 and input ports 22 and 24, and the area of the planar chip 2. The larger the distance between the input ports 22 and 24, the higher the risk of having substantial loss in an input RF signal. Therefore, the RF waveguides 40 and 42 are formed with materials, which minimize loss over long distances, and each of the RF waveguides 40 and 42 can be different from one another. In other embodiments, the distance between the RF function module 12 and input ports 22 and 24 can vary, thus requiring different types of waveguides to be used to minimize loss.

Also, the RF waveguides 40 and 42 can be used as output channels for RF signals, which are processed by the RF function module 12. In this embodiment, the ports 22 and 24 become output ports. The invention can allow the planar chip 2 to receive both optical signals and RF signals simultaneously for processing, where the ports 22 and 24 can be both input and output ports simultaneously also.

When a RF signal is provided as input to ports 22 or 24, the RF function module 12 performs its RF functions, and provides its output to a RF waveguide 38. The RF waveguide 38 is similar to the RF waveguide 36, and propagates the output RF signal of the RF function module 12 to a RF-optical transducer 14. Also, the RF waveguide 38 is designed specifically to minimize loss to the output RF signal. The dimensions of the RF waveguide 38 can vary depending on the distance between the RF-optical transducer 14 and RF function module 12, and the area of the planar chip 2.

The RF-optical transducer 14 receives the output optical signal from the RF function module 12, and proceeds to convert the signal into an optical signal. The optical signal has substantially the same signal properties as its RF counterpart, except that the frequency of the RF signal is in the optical range. The optical signal is decoupled from its RF signal counterpart, but includes RF function properties performed on its RF signal counterpart by the RF function module 8. The RF-optical transducer 14 provides its output to high index waveguides 34.

The high index waveguides 34 are similar to the high index waveguides 30, and they provide a channel for propagating optical signals to modules 16 and 18 within the interior of the planar chip 2 without incorporating any substantial lost to the optical signal. As similarly described for the high index waveguides 30, the more waveguide structures that are used in the high index difference waveguides 34, the higher the density of optical functions, because loss is kept at a minimum. The high index waveguides 34 can also include waveguide structures that are made from different high index materials, and the indexes can vary for each waveguide structure. The high index waveguides 34 interconnect the RF-optical transducer 14 to a second optical function module 16.

The second optical function module 16 receives an optical signal associated with the output of the second optical function module 14 from a first set of the high index waveguides 34 as input, and also receives a control electronic signal from a control module 32 as input. The second optical function module 16 is an integration of more than one optical function connected with one or more optical waveguides, such as filters, splitters, dispersion compensation components, resonators, fiber couplers, switches, polarization rotators, frequency mux/demux, or the like. Examples of optical functions that are performed by the second optical function module 16 include but are not limited to detectors, lasers, modulators, WDM, mux/demux, attenuators, and gain elements. The electronic signal input is used to actuate the optical functions to be performed by the second optical function module 16.

In other embodiments, the second optical function module 16 can perform various optical functions simultaneously without incurring substantial loss to the performance of the planar chip 2, and provides its output to a second set of the high index waveguides 34.

A second waveguide mode converter module 18 receives as input from the second set of the high index waveguides 34 the output from the second optical function module 16, and proceeds to convert the mode of its input optical signal. In particular, the second waveguide mode converter module 18 converts a mode of an optical signal to be useable in a fiber optic line. In this case, an optical signal is converted from a mode that is less than 2 µm to a mode that is greater than 3 µm. Most fiber optic lines require modes between 8 and 10 µm. Therefore, the second waveguide mode converter 18 converts the mode of an optical signal within the range that is used in conventional fiber optic lines.

The second waveguide mode converter 18 provides its output to a second external output optical fiber 20. The second external optical fiber 20 receives the converted optical signal. Given the structural requirements of an optical fiber, the second external output optical fiber 20 has a mode size of approximately 8–10 µm. The mode size can vary depending on the specific carrier properties of an optical fiber. The second external output optical fiber 20 outputs optical signals associated with RF processing. There can be more than one output optical fiber to the planar chip 2.

The optical fibers 4 and 20 can be used as either input or output fibers simultaneously. In this embodiment, the optical fibers 4 and 20 have diameters of approximately 10 µm, however, this can vary. Also, optical fibers with mode sizes ranging from 4–50 µm can also be used in accordance with the invention.

The control module 32 receives as input from an input port 26 external control signals from a controller to manage the modules 8, 12, and 16. Also, the control module 32 processes the signals from the controller into a format useable by the modules, 8, 12, and 16, and outputs interior control signals to modules 8, 12, and 16. These interior control signals include information regarding which type of functions these modules 8, 12, and 16 will perform, and selective data to be provided by the modules 8 12, and 16 to the controller. When the control module 32 receives this data, it immediately processes the information into a format useable by the controller and outputs this information through output port 28 to the controller. Also, the control module 32 can be used to monitor the workload of the modules 8, 12, and 16, therefore improving the throughput of information going in and out of the planar chip 2. The control module 32 uses a line 44 to receive and output information to the optical module 8, 12, and 16, respectively.

The invention allows the optical module 8 and 16 and RF module 12 to communicate in a unidirectional or bi-directional fashion without limiting the performance of the system 2. For example, optical module 16 can provide its output to the mode converter module 18 and RF module 12 using the line 44. The same occurs for modules 8 and 12, respectively. The line 44 interconnects the optical modules 8 and 16 and RF module 12 to each other, and allows unidirectional and bi-directional communication to occur between the modules 8, 12, and 16, respectively.

The planar chip 2 uses silicon mixed technology integrated with a CMOS compatible high index waveguide. In this technology, RF mixed signal (digital and analog) integrated circuits are made using standard silicon CMOS processes on a silicon substrate. Detectors can also be integrated with these components. Depending on the wavelength, silicon, germanium, or germanium detectors can be used in accordance with the invention. Integrated optic wavelength technology using one or a combination of silicon CMOS compatible materials can also be fabricated on this substrate.

A designer of such monolithically integrated optical and RF mixed signal circuit has several options in a choosing a wafer substrate, a wavelength of operation, waveguide and detector materials, and waveguide forming techniques. The choice of the substrate is determined largely by cost vs. performance trade-offs. The RF devices made on compound semiconductor materials can operate at much higher frequencies, while devices made on silicon have as a general rule much lower cost. Using silicon also has the added advantage of being able to leverage off existing silicon foundries. The choice of wavelength depends on the wavelength of the optical carrier. This wavelength determines the material choice for the waveguide and the detector. The choice between growth, deposition, or wafer bonding to form a waveguide layer is based on a cost vs. performance tradeoff. Wafer bonding usually allows greater flexibility in design, since compound semiconductor wafers can be bonded to silicon wafers, whereas growth is cheaper.

The invention can be used with in RADAR or electronic warfare applications. Full-systems or even sub-systems on a chip can be achieved with such technology. Also, the invention can be used in fiber optics communication systems as well as in high speed computing applications. This technology can be made relatively cheap and will provide the user with an enormous amount of bandwidth coupled with the convenience of wireless RF. RF and optical transducers and processors will seamlessly mate the RF and optics technologies together. The invention further provides low loss, low cross talk, and low EMI susceptibility. Also, electronic CMOS integrated circuits can be added for more functionality without substantially burdening the designer.

Although the present invention has been shown and described with respect to several preferred embodiments thereof, various changes, omissions and additions to the form and detail thereof, may be made therein, without departing from the spirit and scope of the invention.

The invention claimed is:

1. A hybrid circuit including micro-optics and RF circuits, said hybrid circuit comprising:
   at least one optical function module that receives or transmits an optical signal and performs at least one of a plurality of optical functions; and
   a RF function module that is coupled to said at least one optical function module and receives or transmits a RF signal and performs at least one of a plurality of RF functions,
   wherein said at least one optical function module and said RF function module are integrated on a single microchip so as to permit optical and RF computations to be performed on either said optical signal or said RF signal,
   wherein at least one RF waveguide provides directly to said RF function module at least one RF signal as input.

2. The hybrid circuit of claim 1 further comprising at least one external input optical fiber inputting said optical signal to said microchip.

3. The hybrid circuit of claim 2 further comprising at least one external output optical fiber outputting optical signals from said microchip.

4. The hybrid circuit of claim 2 further comprising a first waveguide mode converter coupled to said at least one external input optical fiber for receiving said optical signal from said at least one external input optical fiber and converting the mode of said optical signal.

5. The hybrid circuit of claim 4, wherein said first waveguide mode converter converts said mode size of said optical signal to less than 3 μm.

6. The hybrid circuit of claim 4 further comprising a first set of high index optical waveguides interconnecting said first waveguide mode converter and at least one of said at least one optical function module.

7. The hybrid circuit of claim 6 further comprising one or more optical-RF transducers for converting output optical signals from said at least one optical function modules into RF signals.

8. The hybrid circuit of claim 7 further comprising at least one RF waveguide interconnecting said one or more optical-RF transducers and said RF function module.

9. The hybrid circuit of claim 6 further comprising a second set of said high index optical waveguides interconnecting said RF function module and at least one of said optical function modules.

10. The hybrid circuit of claim 1 further comprising one or more RF-optical transducers for converting output RF signals of said RF function module into optical signals.

11. The hybrid circuit of claim 10 further comprising at least one RF waveguide for interconnecting the RF function module and said one or more RF-optical transducers.

12. The hybrid circuit of claim 1 further comprising a control module for providing control signals to said at least one optical function module and said RF function module.

13. The hybrid circuit of claim 12, wherein said control module requests data from said at least one optical module and RF function module for an external controller.

14. The hybrid circuit of claim 13, wherein said control module receives external control signals from said external controller, said control module processing said external control signals in a format useable by said one or more optical function modules or said RF function module.

15. The hybrid circuit of claim 14, wherein said control module receives data from said at least one optical function module or said RF function module to be provided to said external controller, said control module processing said data in a format useable by said external controller.

16. The hybrid circuit of claim 1, wherein said at least optical function module and said RF function module exchange information unidirectional or bi-directional fashion between said modules.

17. A chip for integrating functions performed by micro-optics and RF circuits, said chip comprising:
- at least one optical function module that receives an optical signal and performs at least one of a plurality of optical functions; and
- a RF function module that is coupled to said at least one optical function module and receives a RF signal and perform at least one of a plurality of RF functions,
- wherein said at least one optical function module and said RF function module provides a monolithic integration of optics and RF circuits on said chip so as to permit optical and RF computations to be performed on either said optical signal or said RF signal; and
- wherein at least one RF waveguide provides directly to said RF function module at least one RF signal as input.

18. The chip of claim 17 further comprising at least one external input optical fiber inputting said optical signal to said chip.

19. The chip of claim 18 further comprising at least one external output optical fiber outputting optical signals from said chip.

20. The chip of claim 18 further comprising a first waveguide mode converter coupled to said at least one external input optical fiber for receiving said optical signal from said at least one external input optical fiber and converting the mode of said optical signal.

21. The chip of claim 20, wherein said first waveguide mode converter converts said mode size of said optical signal to less than 3 µm.

22. The chip of claim 20 further comprising a first set of high index optical waveguides interconnecting said first waveguide mode converter and at least one of said at least one optical function module.

23. The chip of claim 22 further comprising one or more optical-RF transducers for converting output optical signals from said at least one optical function modules into RF signals.

24. The chip of claim 23 further comprising at least one RF waveguide interconnecting said one or more optical-RF transducers and said RF function module.

25. The chip of claim 22 further comprising a second set of said high index optical waveguides interconnecting said RF function module and at least one of said optical function modules.

26. The chip of claim 17 further comprising one or more RF-optical transducers for converting output RF signals of said RF function module into optical signals.

27. The chip of claim 26 further comprising at least one RF waveguide for interconnecting the RF function module and said one or more RF-optical transducers.

28. The chip of claim 17 further comprising a control module for providing control signals to said at least one optical function module and said RF function module.

29. The chip of claim 28, wherein said control module requests data from said at least one optical module and RF function module for an external controller.

30. The chip of claim 29, wherein said control module receives external control signals from said external controller, said control module processing said external control signals in a format useable by said one or more optical function modules or said RF function module.

31. The chip of claim 30, wherein said control module receives data from said at least one optical function module or said RF function module to be provided to said external controller, said control module processing said data in a format useable by said external controller.

32. The chip of claim 17, wherein said at least optical function module and said RF function module exchange information in a unidirectional or bi-directional fashion between said modules.

* * * * *